United States Patent Office 3,521,135
Patented July 21, 1970

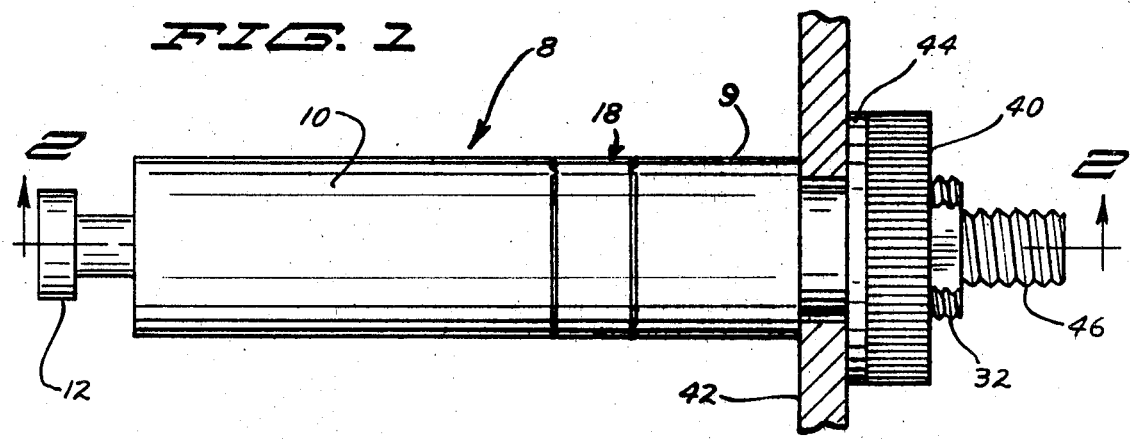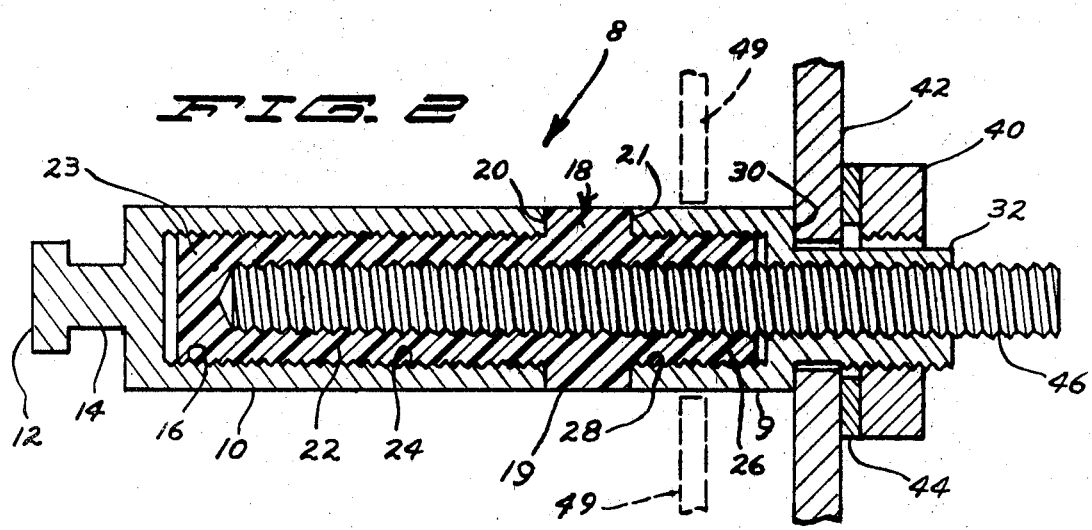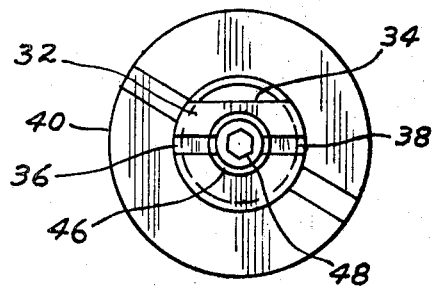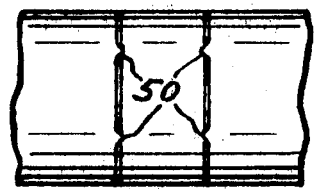
INVENTOR.
JACK L. BOWEN
ATTORNEYS

3,521,135
VARIABLE CAPACITORS
Jack L. Bowen, Waseca, Minn., assignor to E. F. Johnson Company, Waseca, Minn., a corporation of Minnesota
Filed Aug. 19, 1968, Ser. No. 753,535
Int. Cl. H01g 5/12
U.S. Cl. 317—249     15 Claims

ABSTRACT OF THE DISCLOSURE

A trimming capacitor consisting of a pair of cylindrical metallic electrodes between which is mounted a cylindrical dielectric element formed from polytetrafluoroethylene. One electrode which functions as a base is mounted on a supporting panel and is conductively connected to the panel. The dielectric element includes two extensions, one of which projects into a bore within the base electrode. The other extension projects into a central bore within the other electrode. The dielectric element is made hollow by the provision of a longitudinally extending threaded central bore within which a conductive trimmer rotor or screw is threaded. Rotation of the rotor provides small precisely controlled linear changes in capacitance.

---

Trimming capacitors previously available have not always allowed precise capacitance determination with a high degree of resolution or the ability to accurately reset the capacitance at a predetermined value by turning the rotor a given number of turns. In addition to these operating deficiencies, many prior trimming capacitors have been complicated in construction, relatively expensive to manufacture and have not provided the requisite resistance to shock and vibration.

In view of these and other deficiencies of the prior art, it is one object of the present invention to provide an improved trimming capacitor with the capability of providing precisely controlled capacitance and a high degree of resolution.

Another object of the invention is the provision for providing an improved trimming capacitor with a provision for enabling the capacitance to be accurately reset to a predetermined value by moving the rotor a predetermined distance.

Another object of the present invention is the provision of an improved electrically stable trimming capacitor which is capable of undergoing relatively low changes in capacitance and is well suited for VHF and UHF applications requiring a relatively low minimum capacity.

A still further object of the invention is the provision of an improved trimming capacitor of the type described which is simplified in construction and is capable of undergoing linear changes in capacitance with each equal displacement of the rotor.

These and other more detailed and specific objects will become apparent in view of the following specification and drawings wherein:

FIG. 1 is a side elevational view of one preferred form of the invention.

FIG. 2 is a longitudinal sectional view of the invention.

FIG. 3 is an elevational view of the right end of FIG. 2.

FIG. 4 is a partial side elevational view of the center portion of the capacitor.

Briefly, the present invention provides a trimming capacitor of the type having a relatively low minimum capacity (on the order of from about 0.01 to 10.0 pf.) composed of three axially arranged elements including a first, or base electrode suited for mounting on a supporting panel and normally conductively connected to the supporting panel, a second electrode and a dielectric located at one end of the base electrode and including a pair of extensions projecting in diametrically opposed directions, one extending into a bore provided on the base of electrode and the other extending into the bore provided on a second electrode. The dielectric is provided with a longitudinally extending central opening within which a rotor is threadedly mounted. The rotor is also threaded into a portion of the base electrode and is thus conductively connected to it.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

Referring now to the drawings, there is shown a capacitor 8 composed of four major components including axially aligned first, or base electrode 9, dielectric element 18 and a second electrode 10. Within the dielectric element 18 is threaded a rotor 46 as will be described in more detail below.

The electrode 10 consists of a metallic cylinder having a connecting lug 12 at one end thereof. The lug itself is supported at the end of the electrode 10 by means of a neck 14 having a diameter slightly less than the lug 12. The electrode 10 is provided with a central axially extending threaded bore 16 that is open at the right end of the electrode as seen in FIG. 2. The electrode 10 can be formed from any corrosion-resistant metal.

The dielectric element 18 includes a central radially extending circular flange 19 having flat parallel faces 20 and 21 positioned normal to the longitudinal axis thereof. Dielectric element 18 also includes an extension 22 that projects into and is threadedly mounted within the bored opening 16 of the electrode 10. The terminal end (the left end as seen in FIG. 2) is solid and is designated 23 in the figure.

The dielectric element 18 includes also a central longitudinally extending threaded bore that is aligned axially and concentric within the base electrode 9, the dielectric element 18 and the electrode 10. At the right end of the dielectric element 18 is a second extension 26 that projects in a direction diametrically opposite the extension 22. The extension 26 is screw-threaded within a bore 28 within the base electrode 9.

At the right end of the base electrode 9 as seen in the figures, is an externally and internally threaded mounting bracket 32 of a somewhat reduced diameter relative to the diameter of the main portion of the base electrode 9 thus defining a shoulder 30 which serves as a stop for mounting panel 42 to be described below. One side of the bracket 32 is preferably cut away as shown at 34 so that the capacitor can be mounted securely within a round opening having one flat side within panel 42.

The extension 32 is also provided with a longitudinally extending diametrically opposed cuts 36 and 38 for the purpose of securely and resiliently engaging the rotor 46.

When the capacitor is in use, a nut 40 and lock washer 44 is engaged over the extension 32 to securely retain the capacitor within the opening of the panel 42.

The rotor 46 comprises an elongated threaded rod screw-threaded within the central threaded opening 24 of the dielectric element 18 and within the bracket 32 of the electrode 9 with portions of the bracket 32 on opposite sides of the cuts 36 and 38 securely and resiliently engaging the surfaces thereof to form a reliable mechanical and electrical connection between the rotor 46 and the electrode 9. The rotor is provided at its free end with a hexagonal opening 48 for an Allen wrench.

As seen in FIG. 4, the ends of the base electrode and the second electrode 10 adjacent the surfaces 20 and 21 are provided with axially extending projections 50 for the purpose of tightly and securely engaging the dielectric member to retain the elements securely in their fully tightened position. Thus, as the last few turns are made in the threaded connection between elements 9, 18 and 10 the projections 50 will become embedded within the relatively elastic material of the dielectric element 18 thereby securely locking parts of the capacitor together.

Although the physical constants employed in capacitors embodying the invention can be varied considerably, there are listed below typical values for a capacitor utilizing the invention as employed for UHF and VHF applications.

| | |
|---|---|
| Length | 1 3/16 inches. |
| Diameter | 0.218 inch. |
| Nominal capacity | .3–2.9 pf. |
| Torque on rotor | .2 to 10 oz./inch. |
| DC voltage breakdown | 2000 volts. |
| Dielectric material | Polytetrafluoroethylene. |
| Typical Q | 2000 at 1 mHz. |

The capacitor can be mounted in a number of different ways other than described hereinabove. For example, the panel can be bored and the base electrode 9 passed through the opening as shown at 49 in FIG. 2. The base electrode 9 is then soldered to the panel. If this modification is made the nut 40 and lock washer 44 can be eliminated.

The invention provides a number of important advantages. It is not only inexpensive to manufacture but can be assembled quickly and once assembled provides a high degree of resistance to shock and vibration. Moreover, it provides a precisely controllable capacitance and is capable of a high degree of resolution. The capacitance can in addition be accurately reset to a predetermined value by turning the rotor a selected number of turns and the capacitance varies linearly with the number of turns the rotor has made.

The capacitor is well suited for both VHF and UHF applications which require a low minimum capacity and relatively low changes in capacitance.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A trimming capacitor suited for mounting upon a panel, said capacitor comprising a first electrode having means thereon for supportively connecting the capacitor to the panel and for conductively engaging the panel, said first electrode having a bore therein, a dielectric member mounted at one end of the first electrode and including a first extension projecting into the bore in the first electrode, said dielectric member also having a second extension, a second electrode having a bore receiving the second extension of the dielectric member and being supported thereupon, said dielectric member also having a central threaded bore extending axially thereinto, said bore in said dielectric member also extending longitudinally through the first electrode and the second electrode and said dielectric member further including a laterally extending flange portion intermediate said first and second extensions and said first and second electrodes, a trimmer rotor threaded within the bore in the dielectric member for selectively adjusting the capacitance of the capacitor and means conductively connecting the rotor and one of the electrodes.

2. The capacitor of claim 1 wherein the flange on said dielectric member includes substantially parallel end walls, one end wall abutting the first electrode and the other end wall abutting the second electrode.

3. The apparatus of claim 2 wherein said extensions are threadedly mounted within the bores in the first electrode and the second electrode respectively.

4. The apparatus of claim 3 wherein portions of the first electrode and the second electrode abutting the flat parallel walls of the flange on the dielectric member are provided with axially extending projections adapted to engage and project into the flat end walls of the dielectric member to thereby retain the electrodes in the threaded position tightly against the flange of the dielectric member.

5. The capacitor of claim 1 wherein the first electrode comprises an elongated metal element having an enlarged portion provided with said bore and a mounting bracket of a reduced diameter, defining a shoulder and the mounting bracket being adapted to receive a fastening member for retaining the panel in an engaged position abutting the shoulder on the first electrode.

6. The capacitor of claim 5 wherein the bracket on the first electrode is provided with a longitudinally extending transverse cut therein to divide the bracket into two laterally disposed parts adapted to resiliently mechanically engage the rotor to releasably retain the rotor in any selected position and also to conductively engage the rotor.

7. The apparatus of claim 1 wherein the first electrode, the flange of the dielectric member and the second electrode are all cylindrical and of the same outer diameter.

8. The capacitor of claim 1 wherein the dielectric member comprises an elongated element formed from a resinous polymeric material and including a center section having the form of a circular flange with two parallel faces extending normal to the longitudinal axis thereof, said extensions projecting in diametrically opposite direction and each of the extensions being screw-threaded within one of the electrodes.

9. The capacitor of claim 8 wherein the extension screw-threaded into the second electrode is closed at the terminal end thereof by the provision of terminating the bore extending longitudinally through the dielectric member short of the terminal end thereof within the second electrode.

10. The apparatus of claim 1 wherein the second electrode is provided with a mounting lug thereon for connecting a conductor to said capacitor.

11. The capacitor of claim 1 wherein the first electrode extends longitudinally beyond the end of the extension of the dielectric member that projects into the first electrode and is provided with internal screw threads threadedly engaging the rotor to provide a mechanical and conductive connection between the rotor and the first electrode.

12. The capacitor of claim 1 wherein the first electrode, the dielectric element and the second electrode each comprise elongated cylindrical members, the bore extending axially through the center of the dielectric member is aligned with the longitudinal axis of electrodes and the dielectric member and the first electrode includes elastic end portions that resiliently conductively engage the rotor to thereby provide a conductive connection between the rotor and the first electrode.

13. The capacitor of claim 1 wherein the first electrode includes a longitudinally extending threaded bracket at one end thereof having a diameter somewhat less than the diameter of the major portion of the first electrode, said bracket being ground flat on one side thereof and a threaded fastener is screw-threaded upon the bracket for retaining the first electrode in a fixed position on the panel.

14. The apparatus of claim 1 wherein said extensions are threadedly mounted within the bores in the first electrode and second electrode respectively.

15. The apparatus of claim 1 wherein portions of the first and second electrode abutting the laterally extending flange on the dielectric member are provided with axially extending projections adapted to engage and project into the end walls of the flange on the dielectric member to thereby retain the electrodes in the threaded position upon the dielectric member.

References Cited
UNITED STATES PATENTS

| | | |
|---|---|---|
| 2,516,981 | 8/1950 | Hall. |
| 2,595,194 | 4/1952 | Heibel. |
| 2,774,017 | 12/1956 | Shapp. |
| 3,253,477 | 5/1966 | Hopt. |

ELLIOT A. GOLDBERG, Primary Examiner

U.S. Cl. X.R.

317—255